United States Patent [19]

Baeger

[11] Patent Number: 4,521,078
[45] Date of Patent: Jun. 4, 1985

[54] ELECTRO-OPTICAL DISPLAY WITHOUT REFLECTION

[75] Inventor: Holm Baeger, Schwalbach, Fed. Rep. of Germany

[73] Assignee: VDO Adolf Schindling AG, Frankfurt am Main, Fed. Rep. of Germany

[21] Appl. No.: 263,546

[22] Filed: May 14, 1981

[30] Foreign Application Priority Data

May 21, 1980 [DE] Fed. Rep. of Germany ....... 3019311

[51] Int. Cl.³ .............................................. G02F 1/13
[52] U.S. Cl. ............................. 350/334; 350/331 R; 350/276 R
[58] Field of Search .................. 350/331 R, 334, 345, 350/276 R, 344; 362/61; 73/432 AD; D12/192; 353/69

[56] References Cited

U.S. PATENT DOCUMENTS

| 1,369,193 | 2/1921 | Rose | 350/276 R |
| 3,129,285 | 6/1961 | Miller | 350/276 R |
| 3,728,007 | 4/1973 | Myrenne et al. | 350/334 |
| 3,877,790 | 4/1975 | Robinson | 350/344 |
| 3,887,273 | 6/1975 | Griffiths | 353/69 X |
| 4,032,222 | 6/1977 | Lapayre | 350/276 R |
| 4,064,555 | 12/1977 | Ottenstein | 350/815.2 X |
| 4,190,832 | 2/1980 | Mohler | 350/337 X |
| 4,295,712 | 10/1981 | Ishiwatari | 350/337 X |

FOREIGN PATENT DOCUMENTS

| 2139537 | 1/1973 | France | 350/339 R |
| 1108411 | 4/1968 | United Kingdom | 350/276 R |

OTHER PUBLICATIONS

Berman, A. et al., "What Can the Automobile Industry Expect from Liquid Crystal Displays?" *Soc. for Automotive Engineers Technical Paper Series* #790059, (Congress & Expo. Mar. 1979), pp. 1-12.
"New Approach to Vehicle Instrumentation," *Engineering* vol. 215, No. 10, (Oct. 1975), pp. 819-821.
Coonrod J., et al., "Advanced Head-up Display Technology-the Integrated HUD," Proceedings of the IEEE Nat'l Aerospace & Electronics Conference (May 17-19, 1977), pp. 981-990.

*Primary Examiner*—John K. Corbin
*Assistant Examiner*—Richard F. Gallivan
*Attorney, Agent, or Firm*—Martin A. Farber

[57] ABSTRACT

An electro-optical display for displaying characters and symbols on a display surface facing the viewer on the instrument panel of an automotive vehicle without specular reflection, particularly a liquid-crystal display therefor. The display surface is swingably arranged in a position other than 90 degrees relative to the direction in which the observer views the display surface and the characters and symbols are represented in such distorted manner on the display surface that they can be perceived without distortion from the direction of view of the observer.

11 Claims, 7 Drawing Figures

ELECTRO-OPTICAL DISPLAY WITHOUT REFLECTION

BACKGROUND OF THE INVENTION

The present invention relates to an electrooptical display without specular reflection for displaying characters and symbols on a display surface facing the viewer on the instrument panel of an automotive vehicle, particularly a liquid-crystal display.

In such displays there is the problem that light which enters from the outside into the inside of the vehicle may be so reflected in the display surface that the ability of the observer to read the display is at least greatly impeded and frequently even made entirely impossible. It has therefore been proposed to make the polarization filter convex in order to remove specular reflection from liquid-crystal displays.

This, however, has the advantage that due to the relatively large distance between the display in the plane of the liquid-crystal layer and the polarization filter the contrast of the characters and symbols displayed and thus the legibility thereof are impaired.

SUMMARY OF THE INVENTION

The object of the present invention is therefore to create a display in accordance with the introductorily mentioned type which is easily read and is free of specular reflection.

In accordance with the invention, the display surface (1-4) is arranged in a position other than 90° to the direction (5) in which the observer views the display surface and the characters (8) and symbols are represented in such distorted manner on the display surface that they can be perceived without distortion from the direction of view (5) of the observer. In this way it is possible, without additional expenditure, to remove specular reflection from the display with respect to the direction of view of the observer. Impairment of legibility is avoided in the case of a liquid-crystal display by the small distance between the plane of the liquid-crystal layer and the polarization filter. This slight distance also results in a small depth of installation of the display. Furthermore, this display in accordance with the invention can also be easily manufactured.

The display surface may be either flat (1, 2) or curved (3, 4), the focal point in case of the curved embodiment lying outside the direction of view (5) of the observer. Both convex and concave curvature of the display surface are possible.

Furthermore, it is also possible for the display surface to be inclined either at an angle greater than 90° (display surface 2,3) or at an angle less than 90° (display surface 1,4) to the direction of view (5) of the observer.

If the display surface is inclined to such an extent at an angle less than 90° to the direction of view of the observer that it also has a smaller angular inclination than 90° to the longitudinal axis of the vehicle, practically all specular reflection is excluded since the light entering into the vehicle through the windows which are located relatively high up can be reflected by the display surface only to a region which lies below the direction of view of the observer.

In order that the driver can establish the ideal inclination of the display surface (1-4) depending on the position in which he is sitting, the display surface may be made swingable.

Herein the term without specular reflection means reflection with respect to the view of the observer.

With the above and other objects and advantages in view, the present invention will become more clearly understood in connection with the detailed description of preferred embodiments, when considered with the accompanying drawings, of which:

DETAILED DESCRIPTION OF THE PREFERRED EMBODIMENTS

Figure 1:
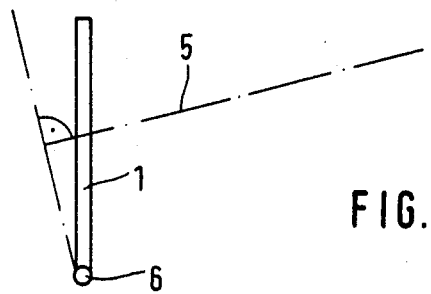
FIG. 1 shows a first embodiment of a display in accordance with the invention.

In the figures, the display surfaces 1, 2, 3 and 4 and the direction of view 5 of the observer are illustrated. The display surfaces 1, 2, 3 and 4 have at their lower end a shaft 6 by which they are swingably mounted in bearings 7. The display surfaces 1 and 2 of FIGS. 1, 2, 5 and 6 are flat while the display surfaces 3 and 4 of FIGS. 3 and 4 are concave.

Figure 4:
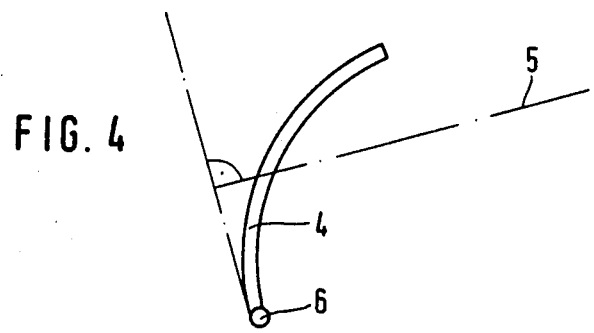
FIG. 4 is a fourth embodiment of a display in accordance with the invention.

In FIGS. 1 and 4, the display surfaces 1 and 4 are inclined to the direction of view 5 of the observer by an angle less than 90°, which has the advantage that no reflection of the windshield onto the display surface is possible either. The special provision of a scoop-shaped recess is thus unnecessary.

Figure 2:
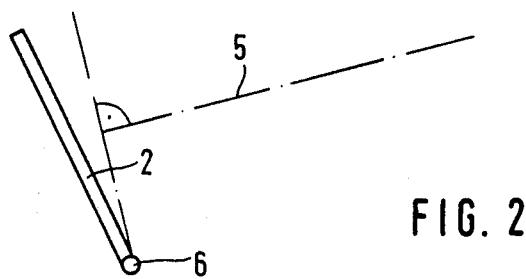
FIG. 2 shows a second embodiment of a display in accordance with the invention.
Figure 3:
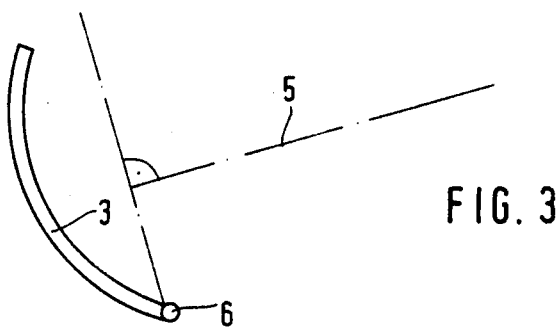
FIG. 3 is a third embodiment of a display in accordance with the invention.

In FIGS. 2 and 3, the inclination of the display surfaces 2 and 3 is greater than 90° to the direction of view 5 of the observer.

By the arrangement of the display surfaces 1, 2, 3 and 4 in accordance with the invention, the light which enters into the interior of the vehicle is reflected in a direction which does not affect the observer.

Figure 5:
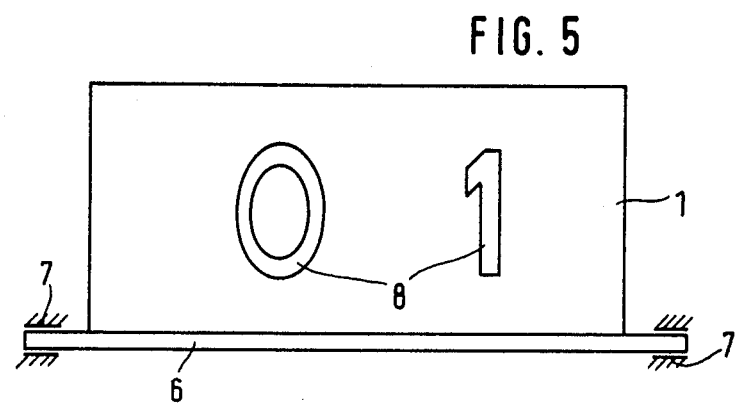
FIG. 5 is a side view of the display of FIG. 1.
Figure 6:
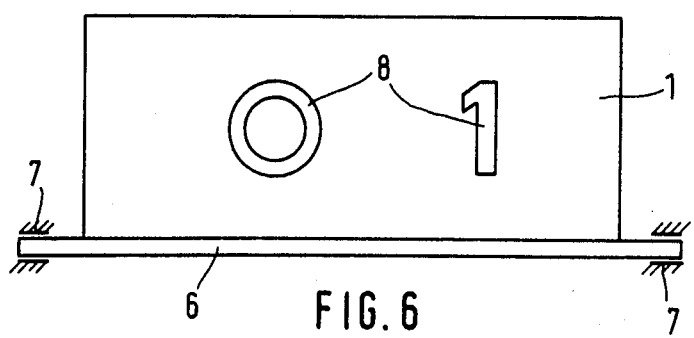
FIG. 6 is a view of the display of FIG. 5 as seen in the direction of viewing.

In order that, due to the inclination of the display surfaces 1, 2, 3 or 4 the observer does not see the characters 8 and symbols in distorted fashion, they are displayed so distorted on the display surface 1, as can be noted from FIG. 5, that they are seen undistorted in the direction of view 5 of the observer as shown in FIG. 6.

Figure 7:
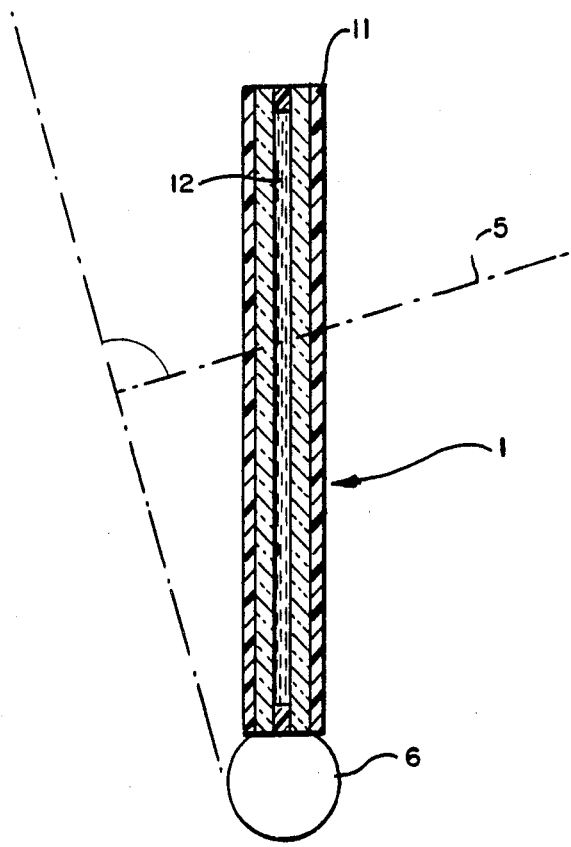
FIG. 7 is an enlarged cross-sectional view of the complete electro-optical display.

FIG. 7 shows the electro-optical display showing the display surface 1, front and rear polarization filters 11 and a liquid crystal substance layer 12 held within cell glasses (unnumbered). The remaining numerals represent the same as in the other views.

While there has been disclosed several embodiments of the invention, these embodiments are given by example only and not in a limiting sense.

I claim:

1. In an electro-optical display on an instrument panel of an automotive vehicle, said display including a liquid crystal layer and a polarization filter, said display for displaying characters and symbols in said liquid crystal layer the improvement wherein a depth of installation of said device on said instrument panel is commensurate with the distance between said filter and said layer; and means for swingably mounting said display on said instrument panel are provided so that a central plane through the characters and symbols of the liquid crystal layer is selectively arrangeable in positions other than 90 degrees relative to a direction in which the observer sitting normally in the vehicle views the liquid crystal display and the configuration of the characters and symbols appearing in the liquid crystal layer is a projection of characters and symbols which is perceivable by the observer from a plane vertical to said direction of view of the observer to said plane of the liquid crystal layer.

2. The electro-optical display as set forth in claim 1, wherein
said display layer is flat.

3. The display according to claim 2, wherein
said entire liquid crystal display is inclined.

4. The electro-optical display as set forth in claim 1, wherein
said display layer is curved and has a focal point out of the direction of view of the observer.

5. The electro-optical display as set forth in claim 4, wherein
said display layer is curved convexly.

6. The electro-optical display as set forth in claim 4, wherein
said display layer is curved concavely.

7. The display according to claim 3, wherein
said entire liquid crystal display is curved.

8. The display according to claim 1, wherein
said means for mounting comprises a shaft at a lower end of the display and
fixed bearing means for pivotably mounting said shaft.

9. The display according to claim 8, wherein
said shaft has opposite ends which extend beyond said display, and
said bearing means comprises bearings in which said ends are disposed.

10. In an electro-optical display for displaying characters and symbols in a liquid crystal layer of the display on an instrument panel of an automotive vehicle, the improvement wherein
the layer of said display is curved and is variably arrangeable in a position other than 90 degrees relative to a direction in which an observer sitting normally in the vehicle views the liquid crystal display;
said display comprising said liquid crystal layer and a polarization filter curved as said to maintain a spacing between said layer and said filter; and wherein
the characters and symbols appearing in the liquid crystal layer are a projection of characters and symbols which are perceivable by the observer from a plane vertical to said direction of view of the observer to said plane of the liquid crystal layer; and wherein
a depth of installation of said device on said instrument panel is commensurate with the distance between said filter and said liquid crystal layer.

11. A dereflected electro-optical display for representing characters and symbols on a display surface thereof facing a viewer on an instrument panel of a motor vehicle having windows and defining a longitudinal axis, wherein
said display surface is arranged in a position wherein a central perpendicular to the display surface is downwardly inclined at an angle relatively to the longitudinal axis of the vehicle, and light arriving from the windows and reflected at the display surface is reflected into a region which is situated below viewing direction of the viewer viewing the display, and
means for pivotally coupling said display to said instrument panel are provided so that said angle is selectively variable.

* * * * *